Patented Aug. 24, 1926.

1,597,602

UNITED STATES PATENT OFFICE.

PAUL KLEIN, OF BUDAPEST, HUNGARY.

TRANSFER.

No Drawing. Application filed April 17, 1924, Serial No. 707,282, and in Hungary January 26, 1924.

This invention relates to transfers.

The known transfers yield a brittle picture layer so that they are unsuitable for ornamenting flexible objects because the pictures soon become cracked and unsightly.

The present invention relates to a transfer layer which gives a completely pliable and yielding picture so that it is suitable even for ornamenting flexible objects such as for example elastic rubber articles. The new transfers allow of an exceedingly easy and rapid method of operation especially when ornamenting rubber articles.

The picture-layer of the present transfers consists of coloured rubber mixtures. The application of the coloured rubber mixtures which serve as colours and which are diluted with a solvent may be effected by stencilling, for example by means of spraying apparatus, or by any suitable printing process. In the latter case it is advantageous to provide the base layer of the transfer prior to printing, with a non-vulcanized caoutchouc layer so as to ensure the transference of the printed pictures from the printing plate to the base.

The base may for example be of paper, especially oiled tracing paper or parchment paper, or also artificial films or skins produced for example from nitrocellulose or cellulose acetate.

The objects to be ornamented are coated with a rubber solution or with rubber latex. After this coating has dried the transfers are merely firmly pressed onto the object to be ornamented without previous moistening with a solvent. The picture layer of the transfer then adheres so firmly to the rubber surface of the object that the paper base of the transfer may be pulled off without any trouble. The picture layer or the coating may thereupon be vulcanized.

The coating with rubber solution or rubber latex can be omitted if the object to be ornamented consists of unvulcanized rubber. Even in the case of vulcanized rubber goods, a mere washing of the rubber surface to be decorated, with a rubber solvent such as for example benzene, may be sufficient for the transference of the picture.

In spite of the fact that the picture layers of the transfers are not vulcanized, they do not exhibit such stickiness as would render handling, storing or packing difficult.

They may, however, be dusted if desired, in which case they must be wiped or moistened with benzene or the like prior to being used.

Having now particularly described and ascertained the nature of my said invention and in what manner the same is to be performed, I declare that what I claim is:—

1. A transfer, in which the layer forming the picture to be transferred consists of coloured rubber mixtures.

2. A transfer consisting of a layer of paper or the like and a superimposed layer upon which the picture is printed by means of coloured rubber mixtures.

3. A process consisting in providing the surface of objects to be ornamented with a coating of unvulcanized rubber, applying a transfer thereto, in which the layer containing the picture to be transferred consists of coloured rubber mixtures and removing the transfer base.

4. A process consisting in providing the surface of objects to be ornamented with a coating of unvulcanized rubber, applying a transfer thereto, consisting of a layer of paper or the like and a superimposed layer upon which the picture is printed by means of coloured rubber mixtures, and removing the layer of paper or the like.

5. A transfer in which the layer forming the picture to be transferred comprises a colored flexible non-brittle material.

6. A transfer in which the layer containing the picture to be transferred comprises a colored flexible and elastic material.

7. A process of ornamentation consisting in providing the surface of an object to be ornamented with a coating of unvulcanized rubber applying a transfer thereto, and removing the transfer base.

In testimony whereof I affix my signature.

DR. PAUL KLEIN.